United States Patent
Palm et al.

(10) Patent No.: US 7,322,283 B2
(45) Date of Patent: Jan. 29, 2008

(54) APPARATUS IN AN INFUSER FOR A LIQUID FOOD PRODUCT

(75) Inventors: Bengt Palm, Genarp (SE); Roland Ringström, Veberöd (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/516,735

(22) PCT Filed: Jun. 5, 2003

(86) PCT No.: PCT/SE03/00927

§ 371 (c)(1),
(2), (4) Date: May 20, 2005

(87) PCT Pub. No.: WO03/103418

PCT Pub. Date: Dec. 18, 2003

(65) Prior Publication Data

US 2005/0204926 A1    Sep. 22, 2005

(30) Foreign Application Priority Data

Jun. 6, 2002    (SE) .................................. 0201722

(51) Int. Cl.
*A23L 3/00* (2006.01)
(52) U.S. Cl. ............................ 99/516; 99/467; 99/471; 99/483; 261/117; 261/118
(58) Field of Classification Search ............... 99/516, 99/534, 471, 467, 323.4, 468, 485–489, 473, 99/483; 426/506, 507, 510–511; 261/115–118; 422/26
See application file for complete search history.

(56) References Cited

U.S. PATENT DOCUMENTS 1,654,799 A * 1/1928 Forrest ...................... 426/263

(Continued)

FOREIGN PATENT DOCUMENTS

| EP | 0402965 A2 | 12/1990 |
|----|------------|---------|
| GB | 1420635 | 1/1976 |

*Primary Examiner*—Timothy F. Simone
(74) *Attorney, Agent, or Firm*—Buchanan Ingersoll & Rooney P.C.

(57) ABSTRACT

The invention relates to an apparatus in an infuser for a liquid food product. The infuser is of the type which includes a pressure vessel (1) with an inlet (2) for the product located in its upper region and an outlet (6) for the product located in its lower region. In the product inlet (2) there is a device for dividing the product entering into the pressure vessel (1) into small droplets. The infuser also includes an inlet (8) for steam. The steam inlet (8) is disposed so that steam enters into the upper region of the pressure vessel (1) through a concentric distribution chamber (9). The distribution chamber (9) is defined by the wall (10) of the pressure vessel (1), a guide plate (11) and at least one foraminated plate (12).

19 Claims, 3 Drawing Sheets

U.S. PATENT DOCUMENTS

| | | | | |
|---|---|---|---|---|
| 1,713,539 A | * | 5/1929 | Le Claire | 261/104 |
| 2,299,046 A | * | 10/1942 | West | 426/506 |
| 2,389,005 A | * | 11/1945 | Sebald | 261/115 |
| 2,631,099 A | * | 3/1953 | Bonotto | 426/319 |
| 4,185,547 A | * | 1/1980 | Nakazato et al. | 99/453 |
| 4,508,029 A | * | 4/1985 | Malone | 99/516 |
| 4,817,518 A | * | 4/1989 | Wyatt et al. | 99/516 |
| 4,878,422 A | * | 11/1989 | McCullough et al. | 99/323.4 |
| 4,898,092 A | * | 2/1990 | Greer | 99/487 |
| 4,939,988 A | * | 7/1990 | Wyatt et al. | 99/516 |
| 5,381,731 A | * | 1/1995 | Thom, Jr. | 99/516 |
| 5,469,781 A | | 11/1995 | Thom, Jr. | |
| 5,989,437 A | * | 11/1999 | Eriksson et al. | 210/744 |
| 6,168,141 B1 | | 1/2001 | Zimmer | |

* cited by examiner

APPARATUS IN AN INFUSER FOR A LIQUID FOOD PRODUCT

TECHNICAL FIELD

The present invention relates to an apparatus in an infuser for a liquid food product, of the type which comprises a pressure vessel with an inlet located in its upper region for the product and an outlet located in its lower region for the product, the product inlet being disposed to finely divide the product entering into the pressure vessel into small droplets, and the infuser also including an inlet for steam, the inlet being disposed such that steam enters into the upper region of the pressure vessel through a concentric distributor chamber.

BACKGROUND ART

Heat treating food products for increased shelf-life is a well-known and often employed method in the art. The food products may, for example, be various dairy produce such as milk, cream or yoghurt. The heat treatment may take place in a plurality of ways, directly or indirectly. Indirect methods are, for example, heating using different types of heat exchangers. Of the direct methods there are two major groups, injection or infusion with steam. By employing a direct method, there will be obtained a very rapid heating, which is highly desirable today when, in order to improve the flavour properties, for example, in milk, the intention is many times to heat the product to elevated temperatures for a short period of time.

The present invention relates to an apparatus where use is made of infusion heating. Infusion entails heating a finely divided liquid in a steam chamber. The principle of heating a liquid, for example a liquid food, by injecting the liquid into a chamber filled with steam has been known from the early 19$^{th}$ century.

The first infusion heating plants were based on the same principle as condensers, with which excess steam from various chemical processes was condensed. The prior art plants thus included an infuser which consisted of a pressure vessel with an inlet for the product in the upper region of the pressure vessel. A distributor chamber discharged in the inlet, the distribution chamber finely dividing the incoming product into small, fine liquid droplets. In the bottom of the pressure vessel there is an outlet for the heated product. The pressure vessel was further provided with an inlet for steam which, in these early infusers, was located in the lower region of the pressure vessel. The steam which, at a low level in the pressure vessel, is injected in towards the finely divided liquid droplets, causes the droplets to change direction. This was a disadvantage when these infusers were, for example, employed for milk. Many of the droplets adhered to the hot inner walls in the infuser, where fouling by the product was the immediate consequence. Fouling entails major hygienic problems and is very difficult to wash off.

One way of obviating the problem inherent in fouling of product on the inner walls of the infuser is to place the steam inlet in the upper region of the infuser. The steam is supplied from above over the distribution chamber of the product so that the droplets are not disturbed in their fall down through the steam chamber. But the admission of steam concurrently with the admission of product also has its drawbacks. This type of steam admission can give rise to fouling of the product around or in the distribution holes or distribution gaps which the distribution chamber of the product inlet displays. This disturbs the heating of the product, the temperature of the product falls, in which event the steam pressure must be increased, and higher temperature differences will be obtained between product and steam. By designing the distribution holes so that they have a very thin edge out towards the steam chamber, this problem can be solved. By thus having extremely thin fouling which is easily broken off, these foulings will disappear before they become disruptive.

But the concurrent admission of steam also involves problems with the incondensable gases which are always found in the product and which are given off in connection with its being heated. The steam also contains a part of theses gases. The gases may consist of oxygen, nitrogen, carbon dioxide and others. These gases must be continuously removed in order to be able to maintain the steam temperature at the same pressure. As a result of a concurrent steam admission, the incondensable gases mix more easily with the steam and it becomes more difficult to remove them without unnecessarily releasing steam from the process as well.

Swedish Patent Specification SE 513 414 describes an infuser which has the steam inlet placed low down in the infuser vessel. As a result, space is created for the incondensable gases to accumulate in the upper region of the vessel, from whence they may be removed from the process in a simple manner. The steam inlet consists of a concentric aperture in the casing surface of the vessel. But this positioning of the steam inlet entails that hot steam enters at high speed into the vessel relatively close to the accumulation of product which is normally formed in the lower region of the vessel before the product departs from the vessel. Steam can then entrain with it product splashes on its way upwards in the vessel and undesirable fouling will be the result.

OBJECT OF THE INVENTION

One object of the present invention is to realise a steam inlet which obviates the majority of the negative effects displayed by prior art solutions and which is disposed such that the steam is guided so that it is at a suitable speed and direction when it meets the product droplets.

SOLUTION

This and other objects have been attained according to the present invention in that the apparatus of the type described by way of introduction has been given the characterising feature that the concentric distribution chamber is defined by the wall of the pressure vessel, a guide plate and at least one foraminated plate.

Preferred embodiments of the present invention have further been given the characterising features as set forth in the appended subclaims.

BRIEF DESCRIPTION OF THE ACCOMPANYING DRAWINGS

One preferred embodiment of the present invention will now be described in greater detail hereinbelow, with reference to the accompanying Drawings. In the accompanying Drawings.

The Drawings show only those parts and details essential to an understanding of the present invention.

DESCRIPTION OF PREFERRED EMBODIMENT

Figure 1:
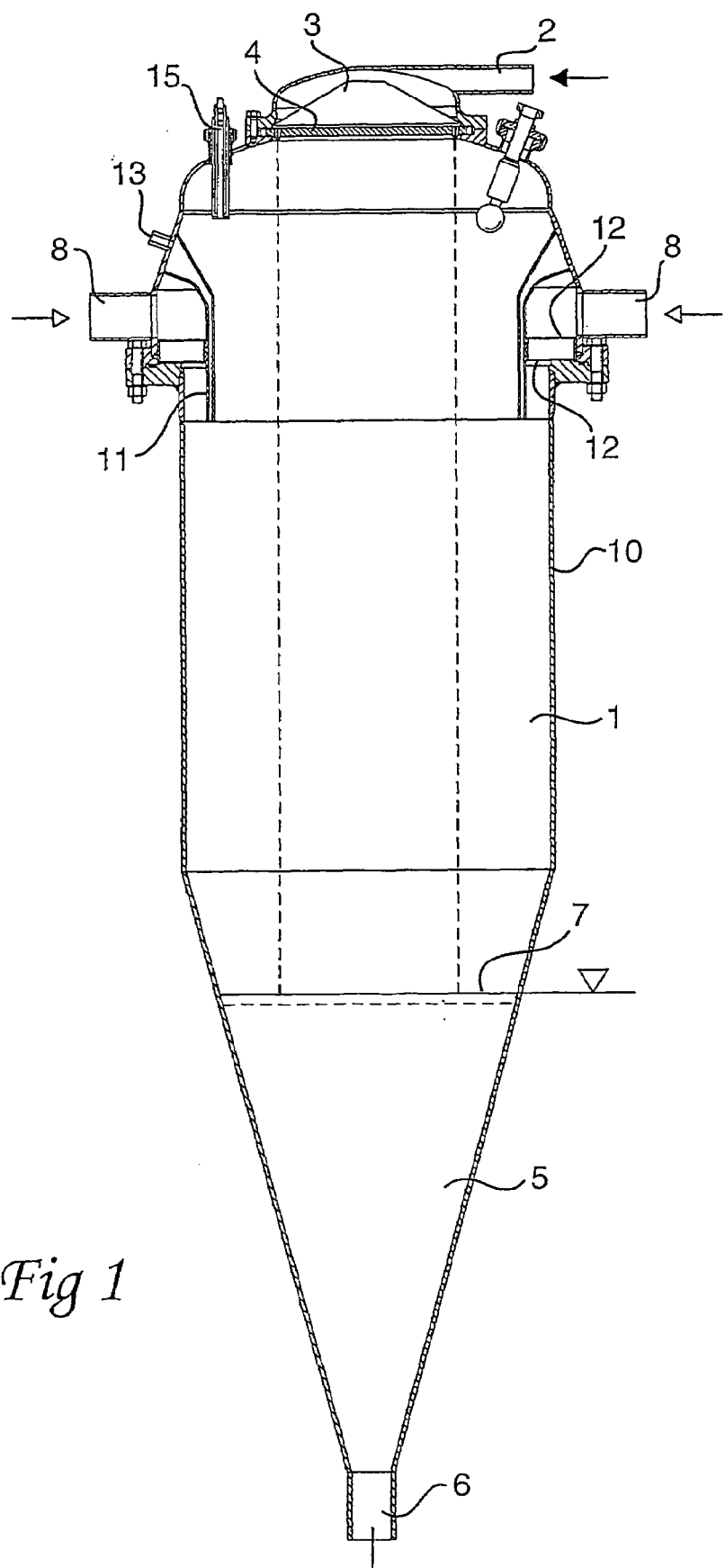
FIG. 1 is a side elevation, partly in section, of an infuser according to the present invention.
Figure 2:
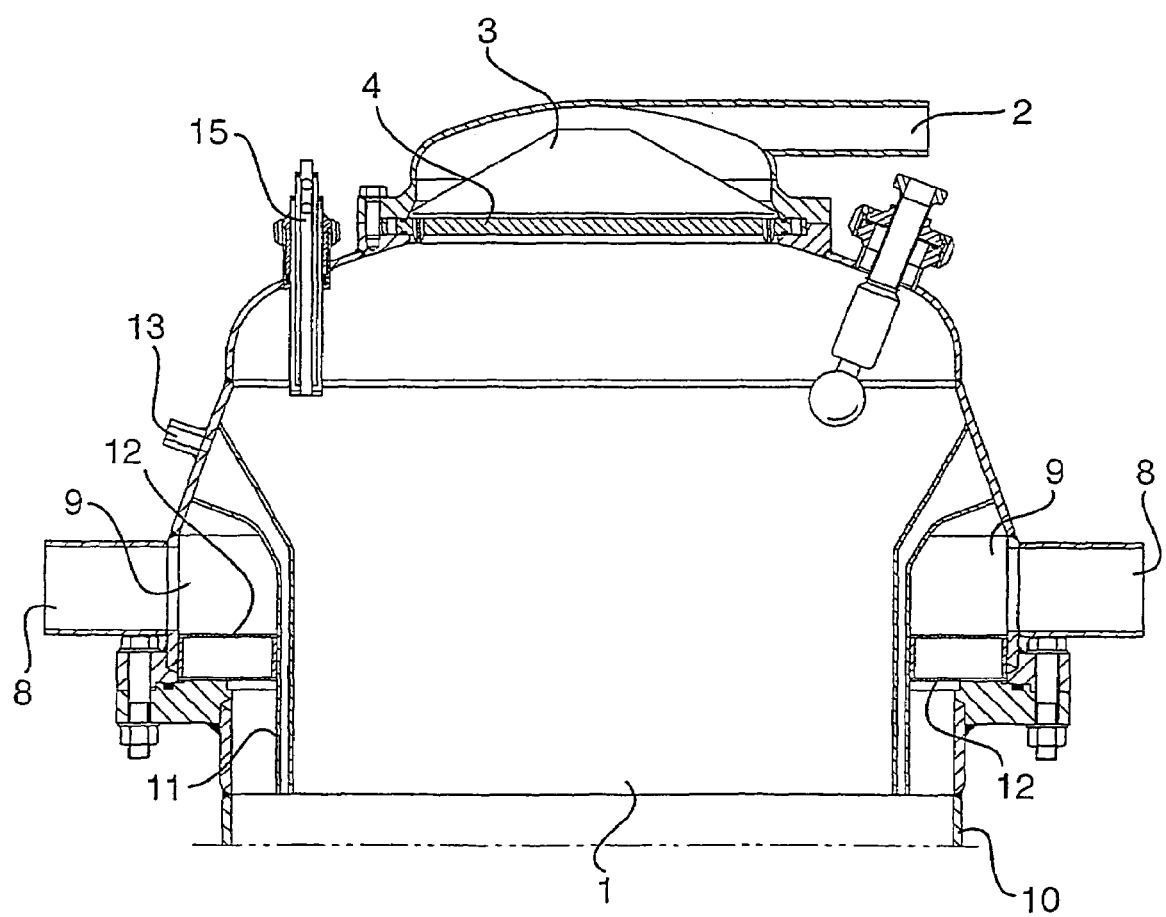
FIG. 2 is a side elevation, partly in section, of the steam inlet of the infuser.

FIG. 1 shows an infuser according to the present invention. The infuser essentially consists of a conventional pressure vessel 1. The pressure vessel 1 has, in its upper region, an inlet 2 for the product which is to be treated in the infuser. The product inlet 2 terminates with a distribution chamber 3. The distribution chamber 3 is centrally positioned in the vessel 1 and is, on its lower wall 4, provided with a large number of holes or gaps. The holes or gaps are intended to finely divide the incoming product so that this first forms fine jets which then progressively change into small, fine droplets which fall down through the pressure vessel 1.

In the lower region, preferably the lowermost region, of the pressure vessel 1 where the pressure vessel 1 forms a conical termination 5, there is disposed an outlet 6 for the product which has been heat treated in the infuser. The lower region of the conical termination 5 of the pressure vessel 1 normally functions as a holding tube, where the product stays at a certain predetermined temperature and during a certain predetermined period of time before being pumped further for additional treatment. The holding tube is indicated in FIG. 1 by the level line 7. Other types of holding tubes can also be employed together with the above described infuser.

An infuser according to the present invention is further provided with at least, and in the preferred embodiment two, inlets 8 for steam. The steam inlets 8 are radially disposed and discharge in a concentric distribution chamber 9 which surrounds the entire pressure vessel 1. The concentric distribution chamber 9 with its steam inlets 8 is placed on a lower level in the vessel 1 than the distribution chamber 3 of the product, but relatively high up in the pressure vessel 1. By distributing the incoming steam over two inlets 8, the speed of the steam is retarded and it is distributed more efficiently in the concentric distribution chamber 9. Both steam inlets 8 are preferably diametrically disposed.

The concentric distribution chamber 9 is defined, on the one hand, by the wall 10 of the pressure vessel 1 and, on the other hand, by a guide plate 11 and at least one foraminated, concentric plate 12. The guide plate 11 is, in the preferred embodiment, double and in the interspace between the guide plates 12 there is the possibility of introducing air at room temperature in order to cool down the guide plates 11. Air is supplied through the inlet 13.

Figure 3:
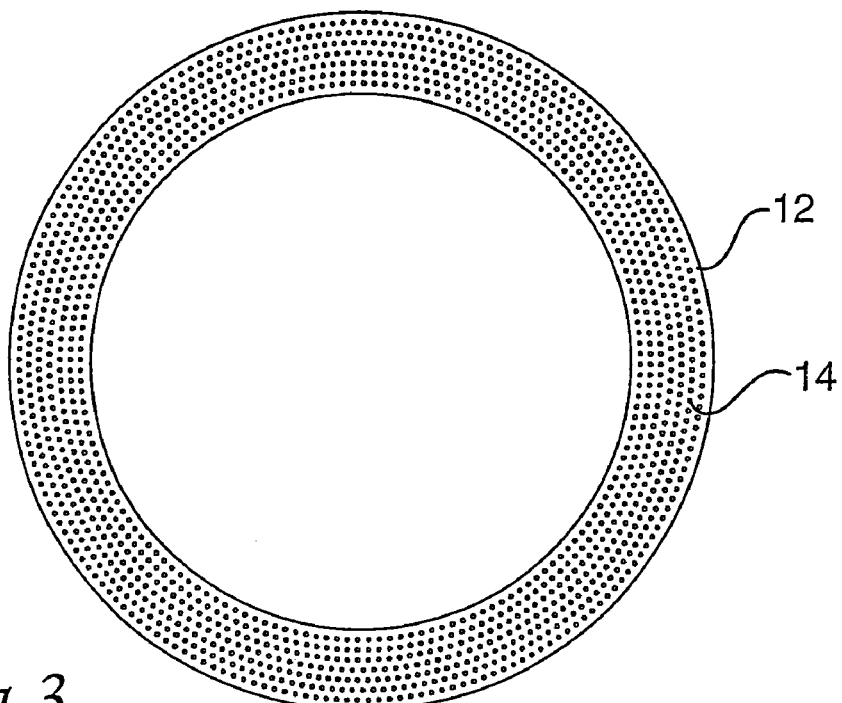
FIG. 3 is a plan view of a first foraminated plate.
Figure 4:
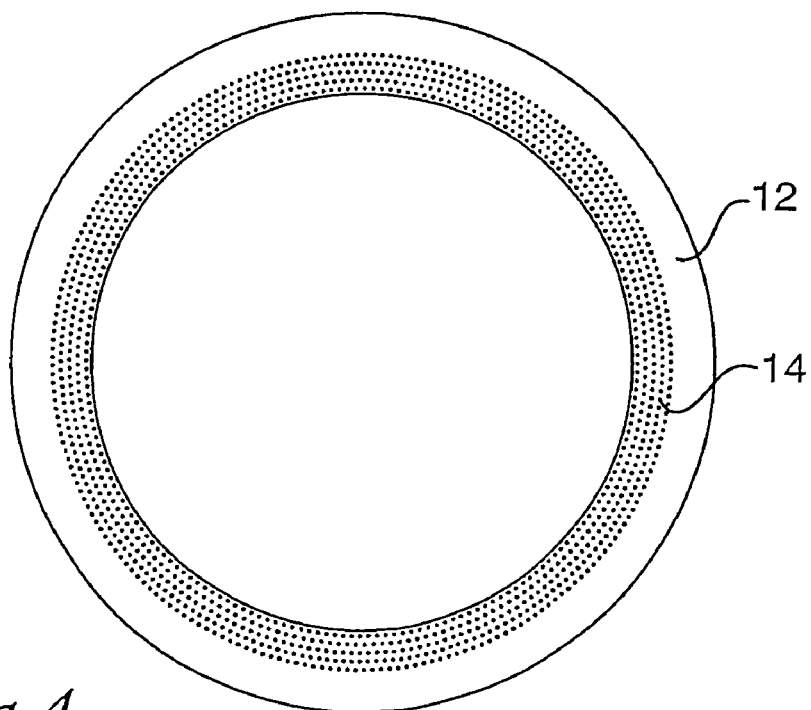
FIG. 4 is a plan view of a second foraminated plate.

The foraminated, concentric plate 12 is placed below the inlets 8 for steam. In the preferred embodiment, there are two foraminated plates 12 disposed above one another. Alternatively, there are three foraminated plates 12 placed above one another. The plates 12 may, as a result of the design of the pressure vessel 1, be of differing appearances, as is apparent from FIGS. 3 and 4. FIG. 3 shows the upper, foraminated plate 12 and FIG. 4 the lower. Alternatively, and depending upon the design of the pressure vessel 1, both plates 12 may have the appearance as shown in FIG. 3.

The foraminated plates 12 display a very large number of small holes 14 disposed therein. The holes 14 have a diameter of 1-10 mm, preferably 2-5 mm. The apparatus according to the present invention has plates 12 which have 1000-1500 holes 14 each. The foraminated plates 12 should be sealingly secured against the casing wall 10 of the pressure vessel 1 and against the guide plate 11. If the anchorage is not completely tight, the incoming steam will take the path of least resistance into the pressure vessel 1, which normally implies that the steam will leak in at the side of the foraminated plates 12. The foraminated plates 12 should be placed in spaced apart relationship from one another a distance which at least corresponds to the diameter of the holes 14 multiplied by five. This is in order to damp the turbulence of the steam after it has passed the upper, foraminated plate 12.

The guide plates 11 should have an extent below the foraminated plates 12 which at least corresponds to the diameter of the holes 14 multiplied by ten. Preferably, the guide plates 11 have an extent below the foraminated plates 12 which is 50-60 mm in order to obtain as uniform a flow of steam as possible.

By the above described arrangement for admitting steam into the infuser, the speed and direction of the steam is controlled. When the steam finally enters into the pressure vessel 1, it should be at a speed of <2 m/sec and should be directed downwards so that it is sucked into towards and accompanies the product when this falls down through the pressure vessel 1.

The product coming into the infuser is pumped through a conduit to the inlet 2 in the upper region of the pressure vessel 1. The incoming product which, for example, may consist of milk, is normally at a temperature of 75-82° C., in certain applications up to 120° C. From the inlet 2 and the distribution chamber 3, the product passes through a large number of holes or gaps provided in the lower wall 4 of the distribution chamber 3. The product thereby forms fine jets which progressively change into a large number of small droplets which fall freely through the pressure vessel 1 until they reach the liquid surface 7. After a short drop, downwardly directed steam will be sucked at a controlled speed in towards the product droplets. The steam which is pressurised is at a temperature of approx. 120-170° C., preferably 140-150° C.

By condensation, the steam rapidly heats the product droplets to the desired temperature, and when the droplets reach the liquid surface 7, the product has reached the desired temperature. The distance between the distribution chamber 3 of the product and the liquid surface 7 should be so large that the product droplets have time to reach the desired temperature. The ready-heated product will thereafter, for a certain period of time, stay in the conical termination 5 of the pressure vessel 1 before departing from the infuser through the outlet 6.

In that the admission of steam gives a controlled speed and direction for the steam, the risk will be minimised that the steam disturbs the fall of the product droplets through the pressure vessel. In that the product droplets may fall undisturbed, the splashing of product is reduced and thereby the fouling of product on the walls 10 of the pressure vessel 1 is consequentially reduced.

During the heating process, incondensable gases are released, such as oxygen, nitrogen and carbon dioxide, from the product. A certain quantity of incondensable gases will also come from the steam which is employed in the process. In that the coolest area in the infuser is disposed in the upper regions of the pressure vessel 1, the incondensable gases accumulate here and can be lead off from the infuser through the outlet 15. The apparatus according to the present invention, with steam inlets 8 and the concentric distribution chamber 9 placed under the distribution chamber 3 of the product, and in that the steam enters into the pressure vessel 1 downwardly directed, creates space for the incondensable gases. The incondensable gases can be accumulated in the upper region of the pressure vessel 1 with as little admixture of steam as possible. As a result, the steam consumption of the process is also minimised.

As will have been apparent from the foregoing description, the present invention realises an apparatus in an infuser which contributes in obtaining a steam admission into the infuser which is controlled in direction and speed in order to obtain an optimum product heating without the drawbacks which the prior art steam admission suffered from.

What is claimed is:

1. An apparatus in an infuser for a liquid food product, the infuser including a pressure vessel with an inlet for the product located in its upper region and an outlet for the product located in its lower region, the product inlet being disposed to divide the product entering into the pressure vessel into small droplets, and the infuser also including at least one steam inlet disposed such that steam enters into the upper region of the pressure vessel through a concentric distribution chamber, wherein the concentric distribution chamber is defined by a wall of the pressure vessel, a guide plate and at least one foraminated plate, wherein the concentric distribution chamber is designed so that the steam, on entering the pressure vessel, is downwardly directed and is at a speed of <2 m/sec, and the pressure vessel is designed so that the product droplets are treated by the steam below the guide plate and the droplets fall freely through the pressure vessel until the droplets reach a liquid surface in the lower region below the guide plate.

2. The apparatus as claimed in claim 1, wherein the apparatus includes two foraminated plates which are sealingly secured against the wall of the pressure vessel and against the guide plate.

3. The apparatus as claimed in claim 2, wherein holes of the plates have a diameter of 1-10 mm.

4. The apparatus as claimed in claim 3, wherein the holes have a diameter of 2-5 mm.

5. The apparatus as claimed in claim 3, wherein the guide plate has an extent below the foraminated plates which at least corresponds to the diameter of the holes multiplied by ten.

6. The apparatus as claimed in claim 3, wherein the guide plate has an extent below the foraminated plates which is 50-60 mm.

7. The apparatus as claimed in claim 1, comprising a product distribution chamber in the upper region, the product distribution chamber includes a planar lower wall having a plurality of holes through which the product passes and forms the small droplets in the pressure vessel, and the droplets fall freely from the lower wall through the pressure vessel until the droplets reach the liquid surface.

8. The apparatus as claimed in claim 7, wherein:
the apparatus includes two steam inlets which are diametrically placed and radially disposed; and
the lower wall is centrally located in the upper region of the pressure vessel.

9. An apparatus in an infuser for a liquid food product, the infuser comprising a pressure vessel with an inlet for the product located in its upper region and an outlet for the product located in its lower region, the product inlet being disposed to divide the product entering into the pressure vessel into small droplets, and the infuser also including at least one steam inlet disposed such that steam enters into the upper region of the pressure vessel through a concentric distribution chamber, wherein the concentric distribution chamber is defined by a wall of the pressure vessel, a guide plate and at least one foraminated plate, and the pressure vessel is designed so that the product droplets are treated by the steam below the guide plate and the droplets fall freely through the pressure vessel until the droplets reach a liquid surface in the lower region below the guide plate.

10. The apparatus as claimed in claim 9, wherein the apparatus includes two foraminated plates which are sealingly secured against the wall of the pressure vessel and against the guide plate.

11. The apparatus as claimed in claim 10, wherein holes of the plates have a diameter of 1-10 mm.

12. The apparatus as claimed in claim 11, wherein the holes have a diameter of 2-5 mm.

13. The apparatus as claimed in claim 11, wherein the guide plate has an extent below the foraminated plates which at least corresponds to the diameter of the holes multiplied by ten.

14. The apparatus as claimed in claim 11, wherein the guide plate has an extent below the foraminated plates which is 50-60 mm.

15. The apparatus as claimed in claim 9, comprising a product distribution chamber in the upper region, the product distribution chamber includes a planar lower wall having a plurality of holes through which the product passes and forms the small droplets in the pressure vessel, and the droplets fall freely from the lower wall through the pressure vessel until the droplets reach the liquid surface.

16. The apparatus as claimed in claim 15, wherein:
the apparatus includes two steam inlets which are diametrically placed and radially disposed; and
the lower wall is centrally located in the upper region of the pressure vessel.

17. An apparatus in an infuser for a liquid food product, the infuser comprising a pressure vessel with an inlet for the product located in its upper region and an outlet for the product located in its lower region, the product inlet being disposed to divide the product entering into the pressure vessel into small droplets, and the infuser also including an inlet for steam disposed such that steam enters into the upper region of the pressure vessel through a concentric distribution chamber defined by a wall of the pressure vessel, a guide plate and at least one foraminated plate, the guide plate having a lower end, and the pressure vessel having a constant inner diameter from the lower end of the guide plate to above the lower end.

18. The apparatus as claimed in claim 17, comprising a product distribution chamber in the upper region of the pressure vessel, the product distribution chamber including a planar lower wall having a plurality of holes through which the product passes and forms the small droplets in the pressure vessel.

19. The apparatus as claimed in claim 18, wherein the lower wall is centrally located in the upper region of the pressure vessel and the droplets fall freely from the lower wall through the pressure vessel until the droplets reach a liquid surface in the lower region below the guide plate.

* * * * *